United States Patent
Duce et al.

(10) Patent No.: US 12,468,183 B2
(45) Date of Patent: Nov. 11, 2025

(54) DIMMABLE WINDOW SYSTEMS AND METHODS

(71) Applicant: The Boeing Company, Arlington, VA (US)

(72) Inventors: Jeffrey Lynn Duce, Seattle, WA (US); Scott Alan Adams, Seattle, WA (US); Edward Ryan Greene, Ladson, SC (US)

(73) Assignee: The Boeing Company

( * ) Notice: Subject to any disclaimer, the term of this patent is extended or adjusted under 35 U.S.C. 154(b) by 54 days.

(21) Appl. No.: 18/314,021

(22) Filed: May 8, 2023

(65) Prior Publication Data
US 2024/0377658 A1    Nov. 14, 2024

(51) Int. Cl.
*G02F 1/01* (2006.01)
*B64C 1/14* (2006.01)

(52) U.S. Cl.
CPC .......... *G02F 1/0121* (2013.01); *B64C 1/1484* (2013.01); *G02F 2203/48* (2013.01)

(58) Field of Classification Search
CPC .. G02F 1/0121; G02F 2203/48; B64C 1/1484
USPC .......................................... 359/245, 265–275
See application file for complete search history.

(56) References Cited

U.S. PATENT DOCUMENTS

| | | | |
|---|---|---|---|
| 8,873,127 B2 | 10/2014 | Neuman et al. | |
| 10,023,028 B2 | 7/2018 | Bugno et al. | |
| 11,137,658 B2 | 10/2021 | Brown et al. | |
| 2008/0042012 A1 | 2/2008 | Callahan et al. | |
| 2008/0239451 A1 | 10/2008 | Mitchell et al. | |
| 2020/0183243 A1 | 6/2020 | Kiefer et al. | |
| 2022/0206603 A1* | 6/2022 | Lesonen | G06F 3/0418 |
| 2022/0365399 A1 | 11/2022 | Brown et al. | |

OTHER PUBLICATIONS

Extened European Search Report for corresponding EP Application No. 24172120.8 dated Feb. 10, 2024 (8 pages).
Communication pursuant to Article 94(3) EPC for corresponding EP Application No. 24172120.8 dated Feb. 10, 2025 (5 pages).

* cited by examiner

*Primary Examiner* — William Choi
(74) *Attorney, Agent, or Firm* — Mary D. Lawlor; The Small Patent Law Group, LLC

(57) ABSTRACT

A system and a method include a dimmable window system including window structure having a first surface and an opposite second surface, and an electrical film component that is operably coupled with the second surface of the window structure. The electrical film component is controlled to change between plural different states. A power source provides power to the electrical film component to change the electrical film component between the plural different states.

20 Claims, 7 Drawing Sheets

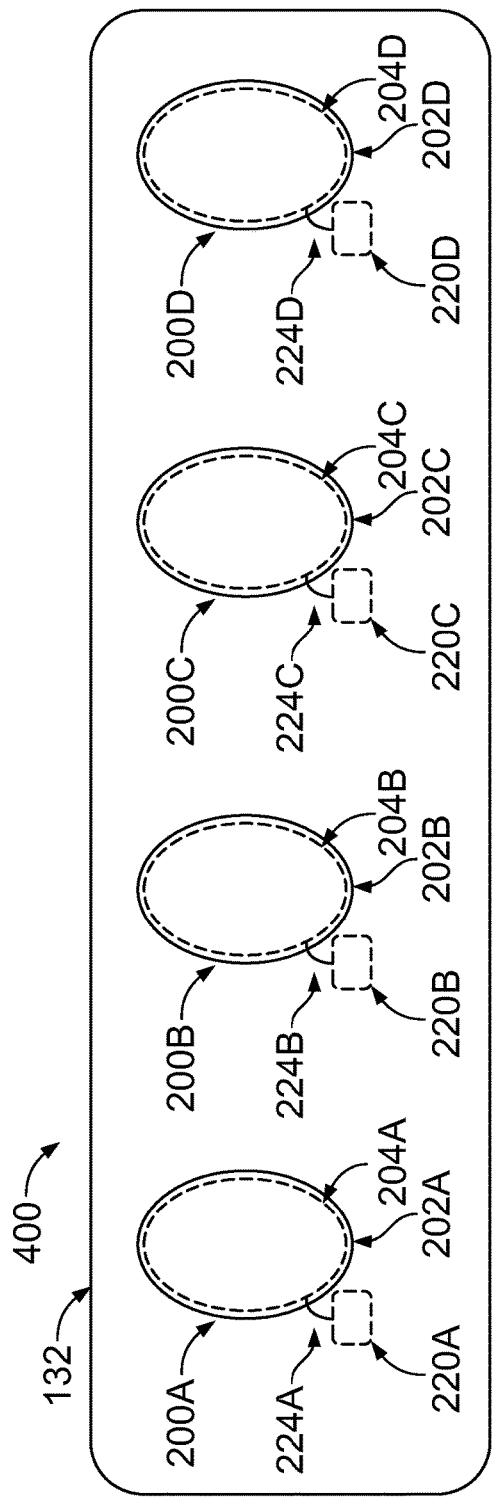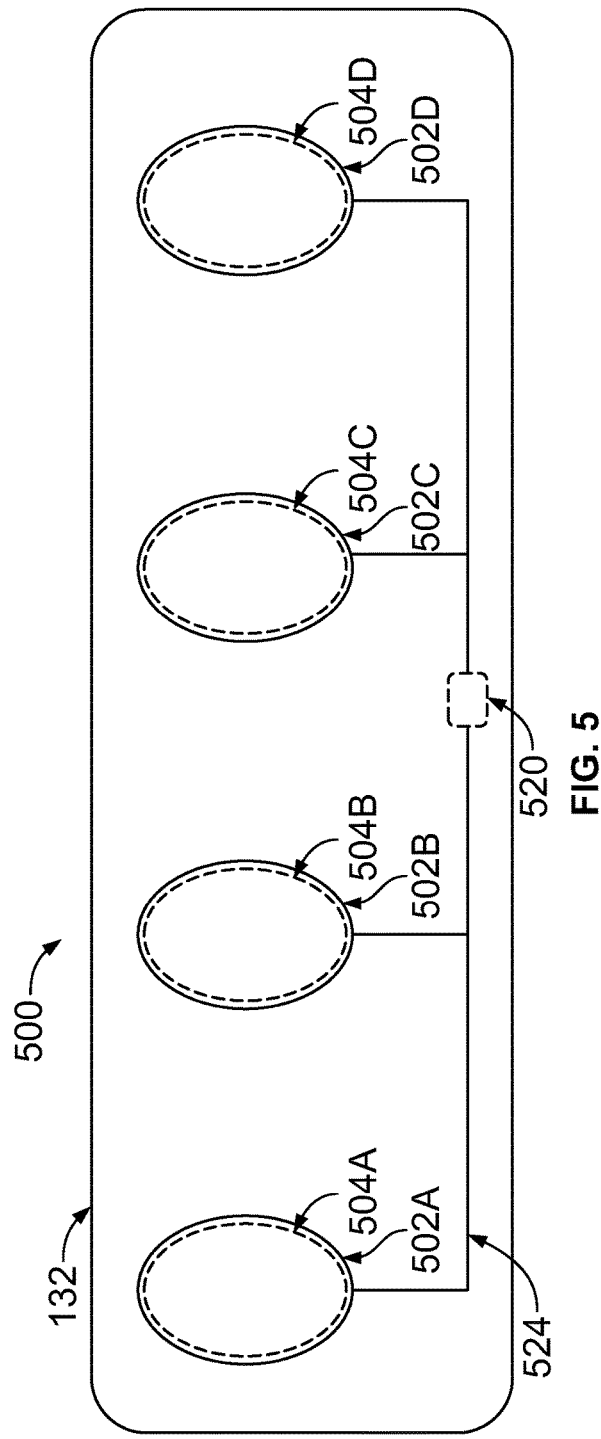

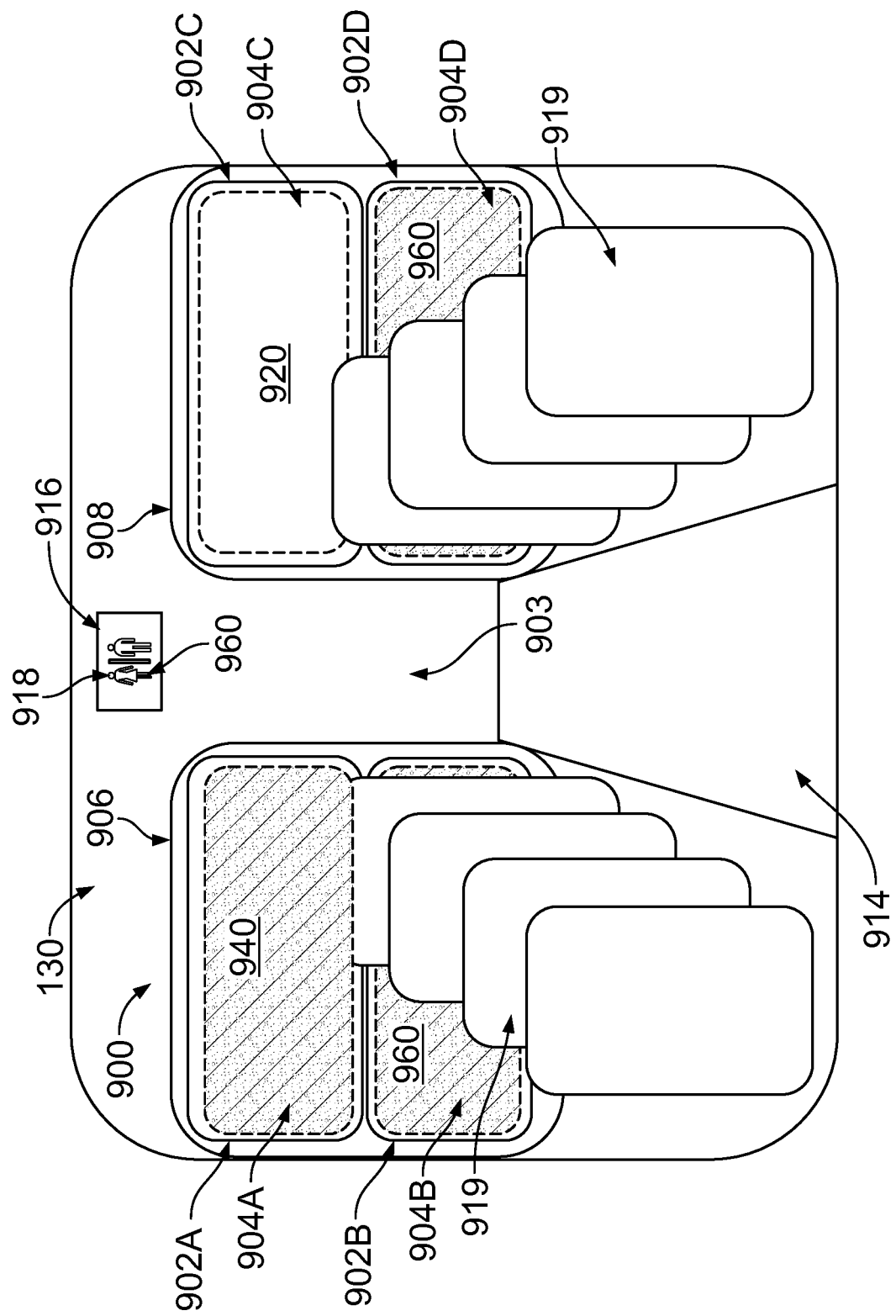

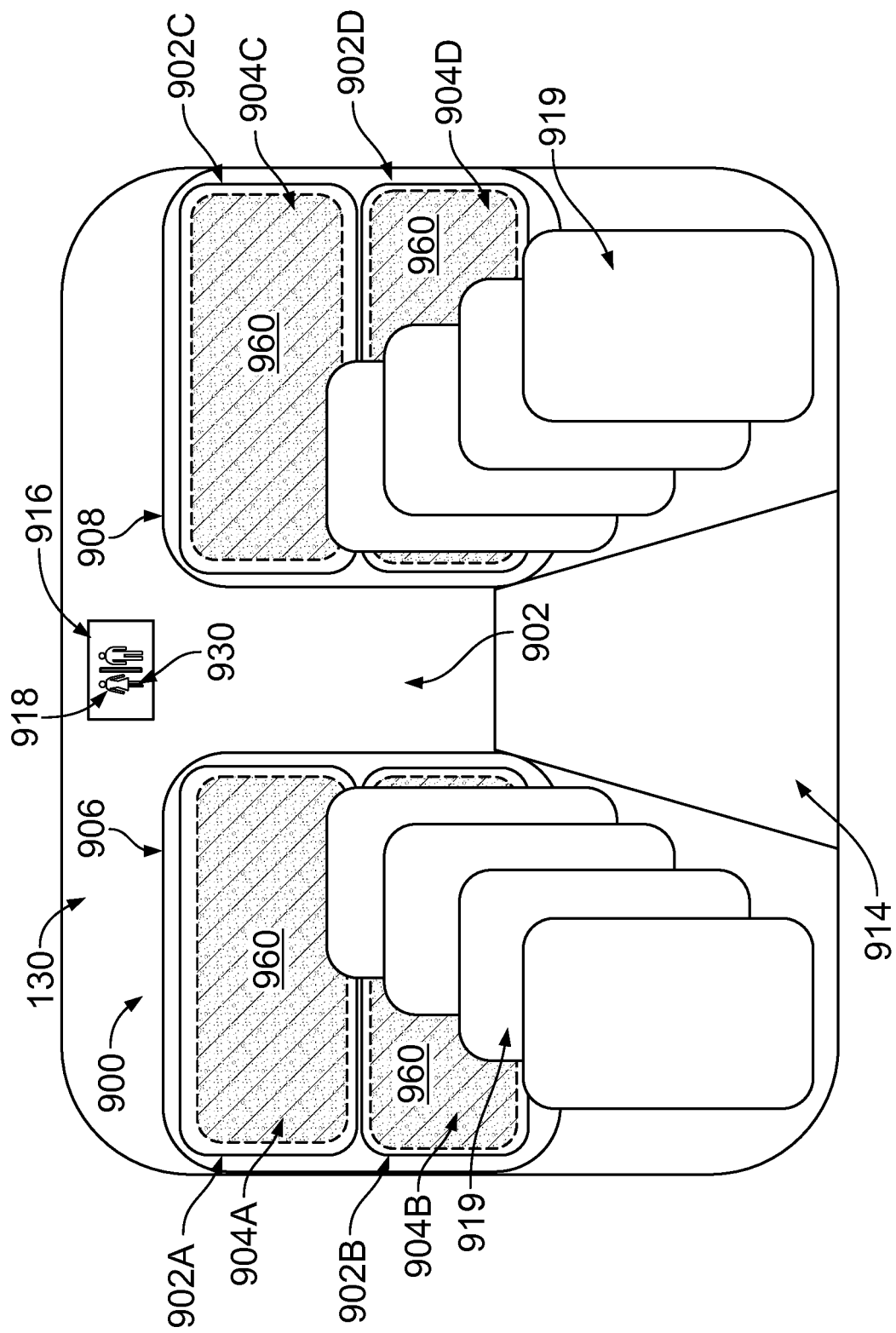

DIMMABLE WINDOW SYSTEMS AND METHODS

FIELD OF THE DISCLOSURE

Examples of the present disclosure generally relate to window systems and methods for controlling a level of transparency of windows.

BACKGROUND OF THE DISCLOSURE

Manually opening and closing plural window shades is a time consuming task. As one example, aircraft window systems include window shades that may be manually moved between open and closed positions. The shades may be moved to the closed position while the aircraft is stationary and loading and unloading passengers, to control a temperature of the internal cabin of the aircraft. Alternatively, the shades may be moved to the open position while the aircraft is operating, such as to allow passengers to view through a window proximate to their seat. As another example, an auditorium may include plural windows or window structures separating a seating area from a congregational area. At times, the window structures may need to be dimmed, such as for a viewing of a movie or pictures, or for a performance of a show, and at other times the window structures may need to be transparent, such as to let in sunlight.

Electrical dimmable window systems have been included in the production of new aircraft systems to allow passengers, pilots, and flight attendants to electrically control a level of visibility through the windows without the need to manually move every shade between open and closed positions. In some applications, electrical dimmable window systems can include an electrical panel that is disposed between a window dust cover (e.g., the interior-most structure of the window system) and a structural window system (e.g., the exterior-most structure of the window system). The electrical panel is electrically coupled with a passenger interface switch that is coupled with an outboard wall of the internal cabin of the aircraft. The passenger may manually operate the passenger interface switch to control a level of transparency of the electrical panel.

The electrical panel is also electrically coupled with a power supply, and with a circuit board of the aircraft. For example, wires electrically couple each electrical panel of each dimmable window system with the aircraft cabin control system, requiring additional wires, wire harnesses, multiple controllers, etc. For an aircraft system that includes plural windows, the additional wires and wire harnesses adds additional weight to the overall aircraft, thereby affecting the efficiency of the aircraft system. Additionally, the electrical dimmable window systems may not be able to be retrofitted onto existing aircraft systems due to the extra wires electrically coupling each electrical panel with the aircraft circuit board. Existing aircraft systems may not have available space to run the extra wires needed to couple the electrical panels with the aircraft control systems.

SUMMARY OF THE DISCLOSURE

A need exists for a system and method for a dimmable window system that does not require data wiring and power systems. Further, a need exists for a dimmable window system and method that can be wirelessly controlled.

With those needs in mind, certain examples of the present disclosure provide a window system of an aircraft system that includes a window structure and an electrical film component that is operably coupled with the window structure. The electrical film component can change between plural different states. A power source can provide power to the electrical film component to change the electrical film component between the plural different states. In one or more examples, the electrical film component can change between the plural different states to control a level of transparency of the window structure. In one or more examples, the electrical film component may be a flexible structure that may be coupled with the window structure.

In at least one example, the power source receives power from one or more sources, and the power source can store at least some of the power received from the one or more sources. In at least one example, the power source may be and/or include a power harvester, which can be harvest thermal energy, photovoltaic energy, RF energy, or energy other sources, such as sources onboard the aircraft system. In at least one example, the energy received and stored by the power source can be stored in an onboard capacitor, a battery, or the like.

In at least one example, the electrical film component includes a sensor, and the electrical film component can change between the plural different states responsive to a detection of thermal energy proximate to the window structure by the sensor. In another example, the electrical film component may incorporate a capacitive touch sensor, and the state of the electrical film component can be changed responsive to the detection of touch from the passenger by the touch sensor.

In at least one example, the state of the electrical film component is controlled by wireless control. For example, the electrical film component can use wireless protocols (e.g., near-field communication, Bluetooth, etc.) for wireless control through passenger smart phones, tablets, through an aircraft wireless control system, or the like. In one example, a flight attendant can wirelessly control two or more of the electrical film components to change from a transparent state to an opaque state, such as while passengers are offboarding from the aircraft system. In another example, a pilot can wirelessly control plural electrical film components to change to a transparent state, such as in the case of an emergency.

In at least one example, the electrical film component includes different regions, and each of the different regions may be controlled to change between the plural different states of transparency. For example, a first portion may be controlled to change to an opaque state (e.g., such as a region through which the sun is shining), and a second portion may be controlled to change to a transparent state (e.g., such as a region through which the sun is not shining, and to allow a passenger to view outside of the aircraft). In another example, the electrical film component may be coupled with an interior window of the aircraft, such as on an interior window disposed in a cabin divider (e.g., between two sections of seats of the aircraft). The flight attendant may change the state of the electrical film components to a transparent state before the aircraft begins to move (e.g., such as while passengers are boarding, deboarding, while flight instructions are being communicated, or the like). Alternatively, the flight attendant may change the state of the electrical film components to an opaque state while the aircraft is cruising, such as to provide privacy between the two classes of passengers.

Certain examples of the present disclosure provide a method that includes changing a state of an electrical film component between plural different states. The electrical film component is operably coupled with a first surface of a window structure. The electrical film component receives power from a power source to change the state of the electrical film component between the plural different states. In at least one example, the state of the electrical film component can be wirelessly changed between the plural different states. In at least one example, the electrical film component includes plural different regions, and the state of the different regions can be independently controlled to change between the plural different states.

Certain examples of the present disclosure provide an aircraft system that includes an internal cabin, plural window structures formed within one or more inboard walls or outboard walls of the internal cabin, one or more electrical film components operably coupled with one or more of the plural window structures, and one or more power sources configured to provide power to the one or more electrical film components to change between plural different states. At least one of the one or more electrical film components can be wirelessly controlled to change between the plural different states. In at least one example, the aircraft system includes two or more electrical film components, and at least two of the two or more electrical film components can be wirelessly controlled to simultaneously change between the plural different states. In at least one example, one or more of the electrical film components includes a sensor, and the state if one or more electrical film components can also be changed responding to a detection of thermal energy proximate to the corresponding window structure of the one or more electrical film components by the sensor.

BRIEF DESCRIPTION OF THE DRAWINGS

FIG. 4 illustrates a window system of an aircraft, according to an example of the present disclosure.

FIG. 5 illustrates plural window systems of an aircraft, according to an example of the present disclosure.

FIG. 9 illustrates a perspective interior view of an internal cabin of an aircraft, according to an example of the present disclosure.

FIG. 10 illustrates a perspective view of an internal cabin of an aircraft, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

In at least one example, dimmable window systems and methods include a window structure, and an electrical film component operably coupled with the window structure. The electrical film component is configured to change between plural different states. A power source is operably coupled with the electrical film component, and provides power to the electrical film component to change the state of the electrical film component between the plural different states. Examples of the subject disclosure provide systems and methods that allow dimmable window systems to be wirelessly controlled to change a level of transparency of the window system. For example, an operator can wirelessly control plural window systems to change to an opaque state or a transparent state. The systems and methods of the subject matter disclosed effectively provide improved dimmable window systems that can be wirelessly controlled to change a level of transparency of windows of the dimmable window systems.

While the embodiments illustrated and described herein are associated with aircraft systems, the dimmable window systems and methods may be included in alternative vehicle systems, such as buses, trains, or the like. As another example, the dimmable window systems and methods described herein may be included in non-vehicle systems, such as in buildings having plural windows.

Figure 1:
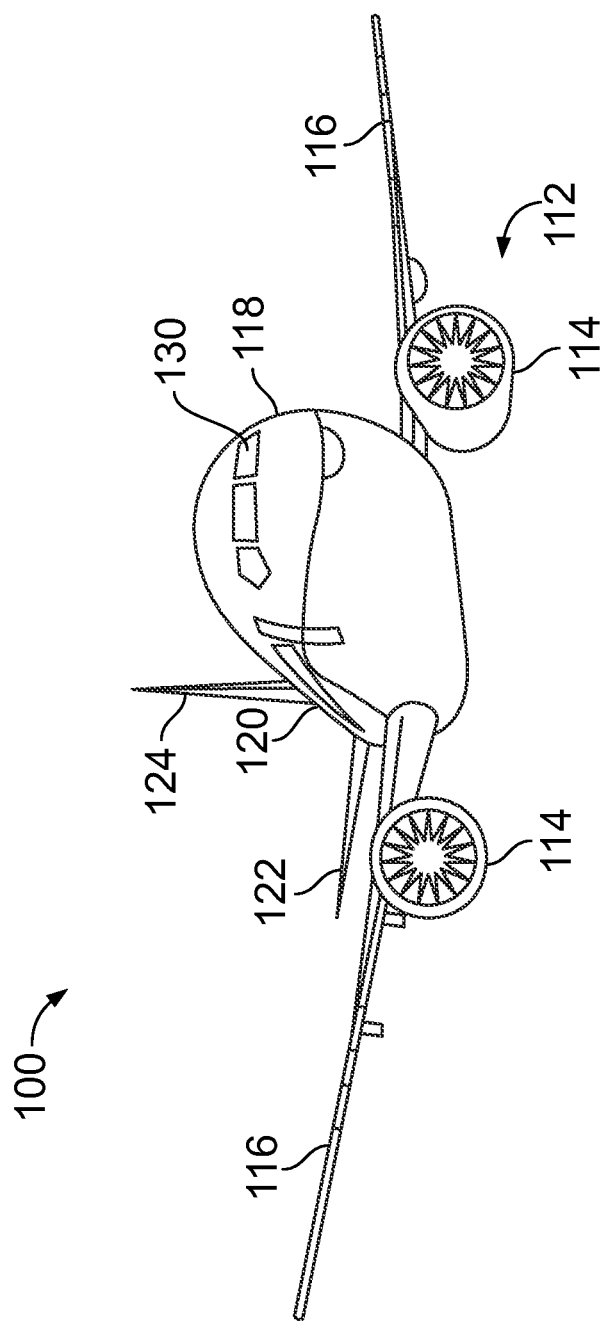
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124. The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like. FIG. 1 shows an example of an aircraft 100. It is to be understood that the aircraft 100 can be sized, shaped, and configured differently than shown in FIG. 1.

Figure 2:
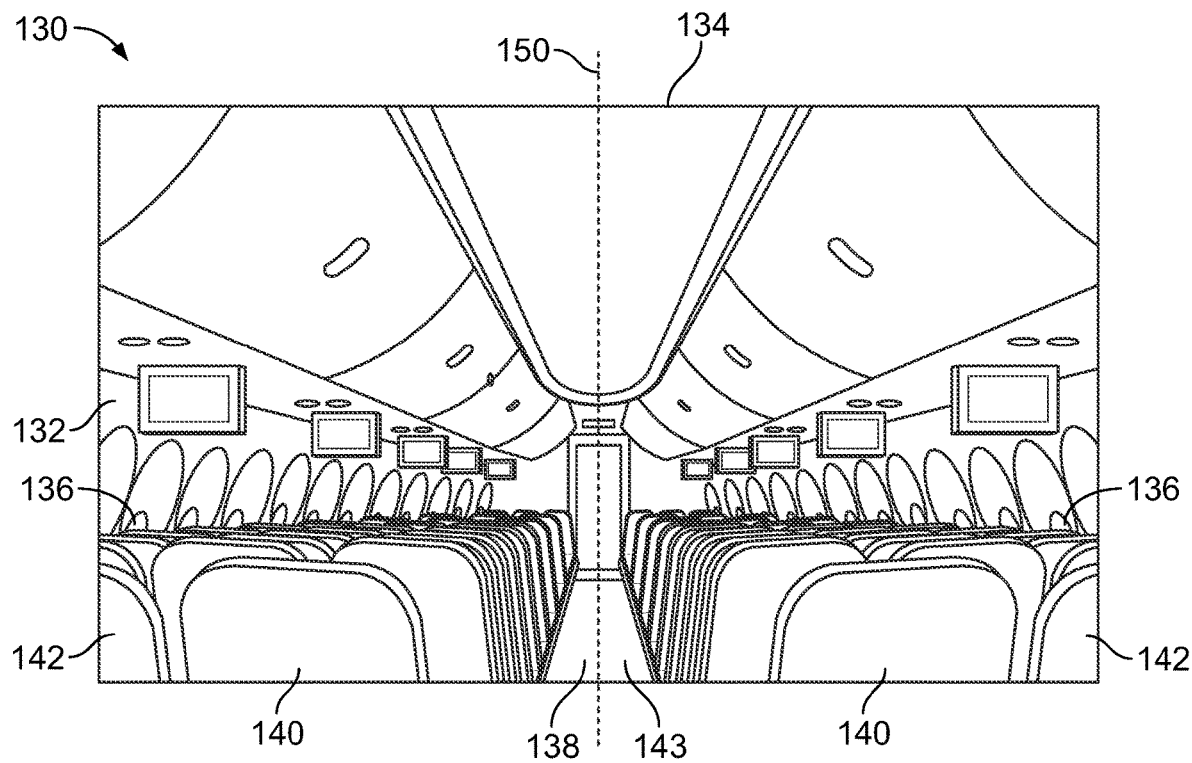
FIG. 2 illustrates a perspective interior view of an internal cabin of the aircraft shown in FIG. 1, according to an example of the present disclosure.
Figure 3:
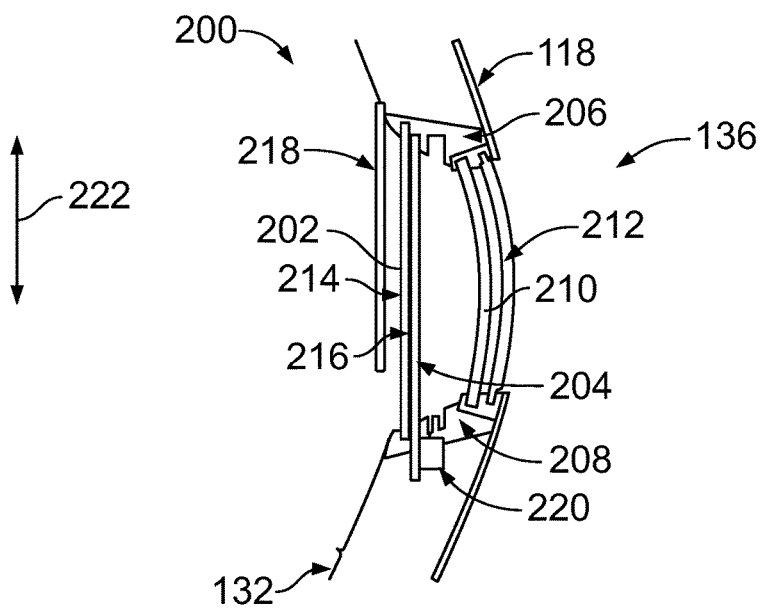
FIG. 3 illustrates a cross-sectional side view of a window system of the aircraft shown in FIG. 1, according to an example of the present disclosure.

FIG. 2 illustrates a perspective interior view of the internal cabin 130 of the aircraft, according to an example of the present disclosure. The internal cabin 130 includes outboard walls 132 and a ceiling 134. Windows 136 may be formed within the outboard walls 132. A floor 138 supports rows of seats 140. As shown in FIG. 3, a row 142 may include three seats 140 on either side of an aisle 143. However, the row 142 may include more or less seats 140 than shown. Additionally, the internal cabin 130 may include more aisles than shown.

As used herein, the term "outboard" means a position that is further away from a central longitudinal plane 150 of the internal cabin 130 as compared to another component. The term "inboard" means a position that is closer to the central longitudinal plane 150 of the internal cabin 130 as compared to another component.

FIG. 3 illustrates a cross-sectional view of a window system 200 of the aircraft 100, according to an example of the present disclosure. The window system is disposed within the outboard wall 132 of the internal cabin and extends between the outboard wall and the surface of the fuselage 118. The window system includes the window 136 that includes an interior window 210 and an exterior window 212. Both of the interior and exterior windows extend between top ends that are operably coupled with an upper interior structure 206 and bottom ends that are operably coupled with a lower interior structure 208.

The window system also includes a window structure 202 that is coupled with the upper interior structure 206 at a first end the lower interior structure 208 at a second end. The window structure includes a first surface 214 that faces towards the internal cabin 130 of the aircraft, and an opposite second surface 216 that faces away from internal cabin. In one or more examples, the window system may include a shade 218 that may be moved between an open position and a closed position by moving the shade 218 in the vertical direction 222. Optionally, one or more window systems of the aircraft may be devoid a shade.

The window system includes an electrical film component 204 that is operably coupled with the window structure 202. In the illustrated example, the electrical film component 204 is coupled with the second surface 216 of the window structure 202, but in other examples, the electrical film component 204 may be coupled with the first surface of the window structure 202. In one or more examples, the window system may include two or more different electrical film components, and one or more of the electrical film components 204 may be coupled with the first surface 214 of the window structure 202, and one or more of the electrical film components 204 may be coupled with the second surface 216 of the window structure 202.

In one or more examples, the electrical film component 204 may be a film assembly (not shown) that includes a base film layer, with a conductive or an electrical ink that is printed onto one or more sides of the base film material. For example, the electrical ink may include one or more electrically charged molecules. The electrical ink may be printed onto the base film layer in a patterned arrangement, in a random arrangement, or any combination therein. The patterned and/or random arrangement for the electrical film component may be determined based on at least in part an end-use of the electrical film component. For example, the printing of the conductive ink may be specified based on a location of the window (e.g., a location on the aircraft), based on a type of aircraft, based on governmental restrictions or requirements, or the like.

In one or more examples, the electrical film component 204 may be a flexible structure or flexible component. For example, the electrical film component 204 may flex or bend to form to a shape of a surface to which the electrical film component 204 is coupled (e.g., the first or second surfaces 214, 216 of the window structure 202, or the like). The electrical film component 204 may be coupled with one of the surfaces of the window structure via an adhesion layer (e.g., a clear or transparent adhesive material) of the film assembly, a patterned and/or random arrangement of one or more adhesive components (e.g., adhesive strips, adhesive dots, or the like), or the like.

In one or more examples, the arrangement of electrical ink molecules may change, or the molecules may migrate to different locations on the film under the effect of an electrical field, a thermal field, or the like. For example, the electrical film component 204 may be referred to as an electrophoretic component, a thermochromic component, an electrochromic component, or the like.

The molecules of the electrical ink may be controlled to move to change the state of the electrical film component 204 between plural different states. For example, the electrical film component 204 may be in a transparent state, allowing visibility through the window structure. Alternatively, the electrical film component 204 may be in an opaque state, at least partially prohibiting visibility through the window structure. Optionally, the electrical film component 204 may be in one or more partial opaque states or partial transparent states (e.g., at one or more gradient levels of visibility between the transparent state and the opaque state). In another example, the electrical ink disposed on the electrical film component may change states in a patterned and/or random arrangement. For example, the electrical ink may be disposed on the film in a speckled or dotted pattern arrangement, and the speckles or dots may change between the opaque state and the transparent state, to control a level of visibility through the window structure 202. In another example, the electrical ink may be disposed on the film in an arrangement of plural lines, and the plural lines may change between the opaque state and the transparent state. In another example, the electrical ink may have a color quality to the ink, and changing of the state of the electrical film component may include the electrical ink changing from a transparent state to a colored opaque state, changing from a first colored opaque state to a different, second colored opaque state, or the like.

The electrical film component 204 may be a dimmable component that can be transparent, opaque, or at a level of partial transparency therebetween, to control a level of transparency through the window structure. For example, the window system 200 is a dimmable window system by changing the state of the electrical film component 204 between the plural different states.

In one or more examples, the electrical ink may be and/or include one or more capacitive touch sensors (not shown), such that the state of the electrical film component 204 may be controlled by a passenger of the aircraft by the passenger touching the first surface 214 of the window structure 202. For example, the state of the electrical ink may be controlled responsive to the detection of contact or pressure by a passenger, the detection of thermal energy from the passenger, or the like.

In one or more examples, the state of the electrical ink may be wirelessly controlled by one or more wireless protocols (e.g., near-field communication, Bluetooth, or the like). For example, an operator may wirelessly control the state of the electrical film component 204 by using a smartphone, a tablet, an alternative computer device, or the like. In one or more examples, the operator may control the state of one or more electrical film components 204 by controlling inputs into processing system (e.g., an interactive display having a graphical user interface that may be disposed within a headrest of a seat of the aircraft, or the like). In one example, the aircraft may include plural window systems that include plural electrical film components. An operator (e.g., a flight attendant, a pilot or co-pilot, or the like) may substantially simultaneously control the state of one or more of the plural electrical film components 204 by entering one or more inputs into a device having wireless capabilities (e.g., a smartphone, a tablet, a passenger entertainment system, an aircraft wireless control system, etc.).

For example, a flight attendant may enter a single input into the wireless device to change the state of one or more electrical film components, such as to control a temperature of the internal cabin, to provide visibility to passengers of the aircraft (e.g., in the case of an emergency landing), or the like. In another example, the flight attendant may change the state of a first group of electrical film components, and may not change the state of a second group of electrical film components.

The window system 200 also includes a power source 220 that is electrically coupled with the electrical film component 204. In one or more examples, the power source 220 may be electrically coupled with the electrical film component 204 via one or more wires or conduits, one or more electrical contacts directly and/or indirectly coupled with the electrical film component 204, or the like. The power source 220 may provide power to the electrical film component 204 to change the state of the electrical film component 204 between the plural different states responsive to the detection of electrical signals. For example, the power source 220 may provide power to the electrical film component 204 only to change the state of the electrical film component 204, and the power source 220 may not provide power to the electrical film component 204 when the state of the electrical film component 204 does not need to be changed and/or is not being changed. For example, the power source 220 may provide intermittent power, and may not provide continuous power, to the electrical film component 204.

In one or more examples, the power source 220 may a battery cell, a super capacitor, or an alternative device that is capable of storing energy. In one or more examples, the power source 220 may include and/or be coupled with one or more energy power harvester devices that may harvest and/or receive power from one or more sources (e.g., sources onboard the aircraft, sources proximate to the aircraft, etc.). For example, the energy may be thermal energy, vibrational, photovoltaic panels (transparent or non-transparent), a radio-frequency (RF), or the like. In one example, the aircraft may include one or more photovoltaic panels operably coupled with an exterior surface of the fuselage, that may collect solar power, that may be provided to the power source. The power source 220 may store at least some of the power received from the one or more sources, and may supply the stored power to the electrical film component 204.

In one or more examples, the window system 200 (e.g., including the window structure 202, the electrical film component 204, and the power source 220) may be a new window system that may be designed and built into a new aircraft. As another example, one or more components of the window system 200 may be retrofitted onto an existing aircraft. For example, the window structure may be an existing window structure, and the electrical film component and the power source may be retrofitted onto the existing window structure. As another example, the aircraft may include an electrical film component, but the electrical film component may need to be replaced with a new electrical film component. For example, the existing electrical film component may be damaged, the electrical molecules of the ink may fail to move correctly, or the like.

FIG. 4 illustrates an aircraft system 400 that includes plural window systems 200A-D disposed on the outboard wall 132 of the aircraft, according to an example of the present disclosure. Each of the window systems 200A-D includes a window structure (e.g., window structures 202A-D) and an electrical film component (e.g., electrical film components 204A-D). Each window system also includes a power source (e.g., power sources 220A-D). For example, a first power source 220A is electrically coupled with a first electrical film component 204A that is coupled with a surface of a first window structure 202A via a first wire 224A; a second power source 220B is electrically coupled with a second electrical film component 204B that is coupled with a surface of a second window structure 202B via a second wire 224B; a third power source 220C is electrically coupled with a third electrical film component 204C that is coupled with a surface of a third window structure 202C via a third wire 224C; and a fourth power source 220D is electrically coupled with a fourth electrical film component 204D that is coupled with a surface of a fourth window structure 202D via a fourth wire 224D. Each of the power sources 220A-D may store energy, and may provide the stored energy to the corresponding electrical film component 204A-D to change the state of the electrical film component 204A-D between the plural different states.

FIG. 5 illustrates a window system 500, according to another example of the present disclosure. The window system 500 includes plural window structures 502A-D disposed on the outboard wall 132 of the aircraft, and plural electrical film components 504A-D that are operably coupled with the corresponding window structure 502A-D. The window system 500 includes a power source 520 that is operably coupled with each of the electrical film components 504A-D via one or more wires 524. For example, the power source 520 is operably coupled with a first electrical film component 504A, a second electrical film component 504B, a third electrical film component 504C, and a fourth electrical film component 504D. The power source 520 provides power to each of the electrical film components 504A-D. In one or more examples, the window system 500 may include one or more power control devices (not shown) that may control an amount of power that is provided to each of the different electrical film components. Optionally, the power source 520 may include plural different power storage cells. For example, the power source 520 may include a number of power storage cells that corresponds to a number of electrical film components that the power source may be providing power to. In the illustrated example, the window system 500 includes four window structures. In one or more examples, a single power source may be setup to provide power to any number of electrical film components.

Figure 6:
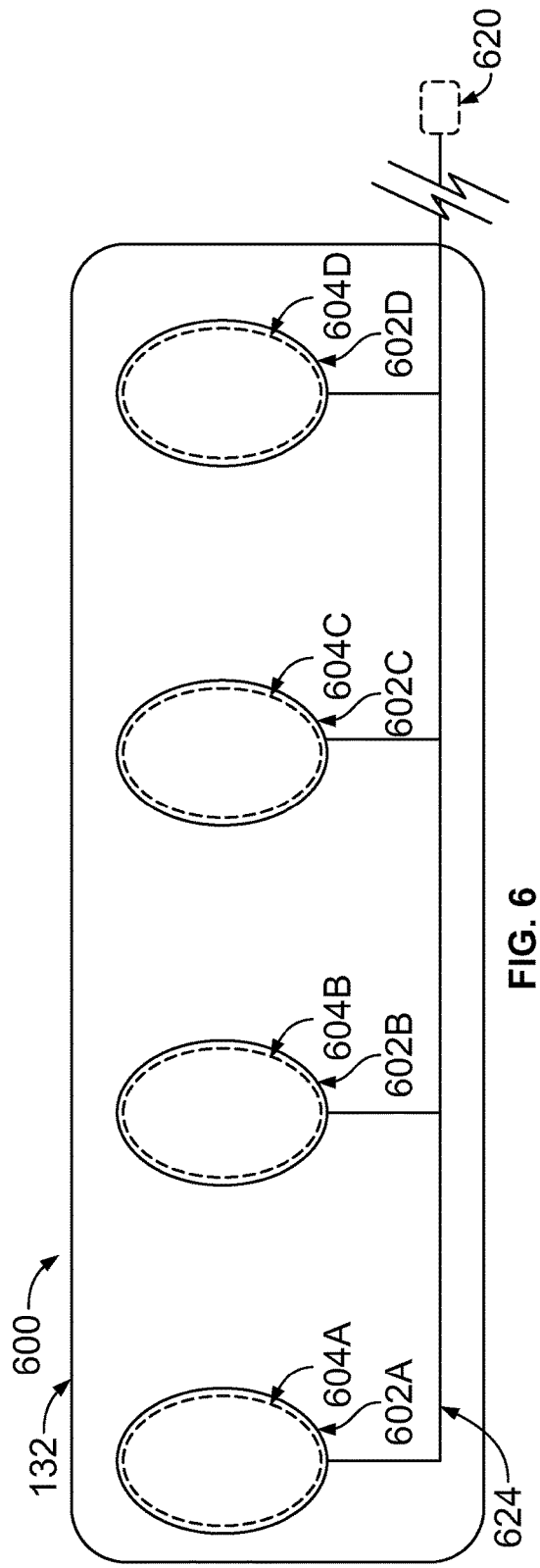
FIG. 6 illustrates plural window systems of an aircraft, according to an example of the present disclosure.

FIG. 6 illustrates a window system 600, according to another example of the present disclosure. The window system 600 includes plural window structures 602A-D disposed on the outboard wall 132 of the aircraft, and electrical film components 604A-D that are operably coupled with the corresponding window structure 602A-D. The window system 600 includes a power source 620 that is electrically coupled with each of the electrical film components 604A-D via one or more wires 624. In one or more examples, the power source 620 may be associated with a control system (not shown) of the aircraft 100. For example, the power source 620 may also provide power to one or more systems and/or electrical devices of the aircraft.

Figure 7:
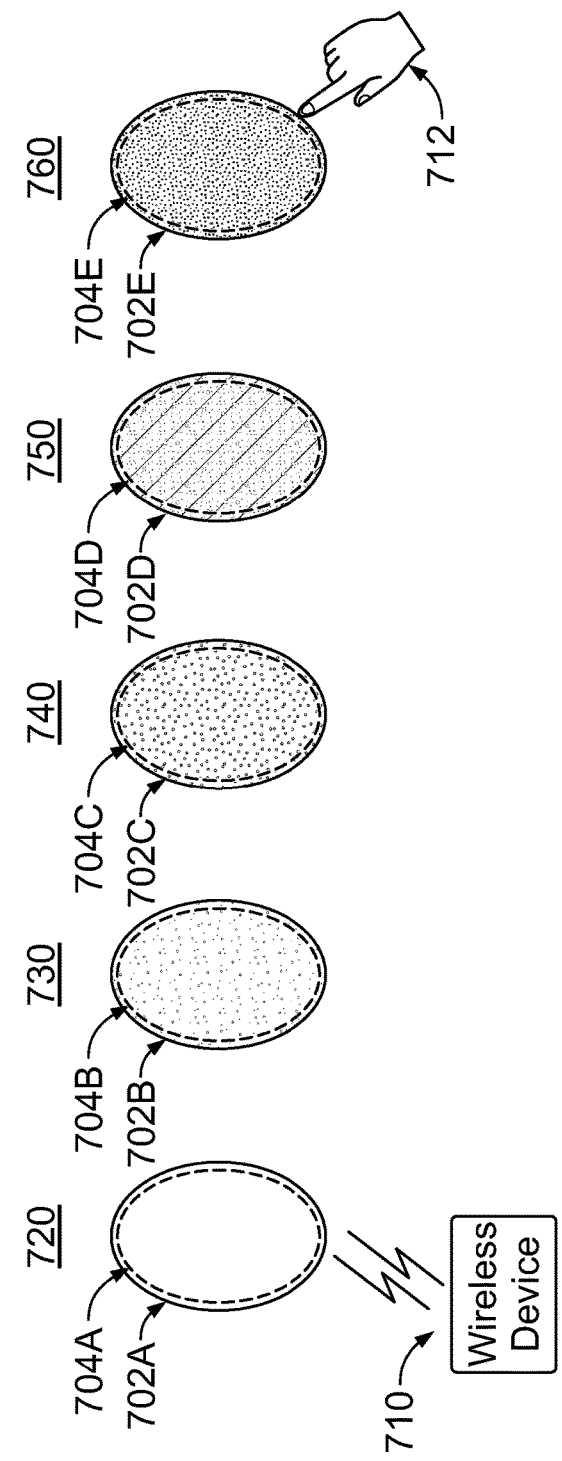
FIG. 7 illustrates plural different states of electrical film components of a window system, according to an example of the present disclosure.

FIG. 7 illustrates plural different states of electrical film components 704A-E of a window system, according to an example of the present disclosure. Each of the electrical film components 704A-E is operably coupled with a first or second surface of a corresponding window structure 702A-E. The window system also includes one or more power sources (not shown) that may be electrically coupled with one or more of the electrical film components 704A-E. The state of each of the electrical film components 704A-E may be changed by electrical and/or thermal control, such as wirelessly by a wireless device 710 (e.g., a smartphone, a tablet, a passenger entertainment system, an aircraft control system, or the like), by the detection of thermal energy and/or the detection of pressure or contact, such as from a finger 712 of an operator, or the like.

In the illustrated example, a first electrical film component 704A is in a transparent state 720, and a fifth electrical film component 704E is in an opaque state 760. For example, a person may be able to view through the first window structure 702A, but a person may be unable to view through the fifth window structure 702E. The second, third, and fourth electrical film components are controlled to be in plural different partial states 730, 740, 750 (e.g., partial opaque states and/or partial transparent states). For example, a second partial state 730 is more opaque than the transparent state 720, but is less opaque than a third partial state 740. Similarly, a fourth partial state 750 is more opaque than the third partial state 740, but is less opaque than the opaque state 760. Each of the different electrical film components 704A-E may be independently controlled to be in one of plural different states. In another example, two or more of the electrical film components 704A-E may be substantially simultaneously controlled to be in one of the plural different states, such as by a pilot and/or flight attendant controlling the state of the two or more of the electrical film components 704A-E.

Figure 8:
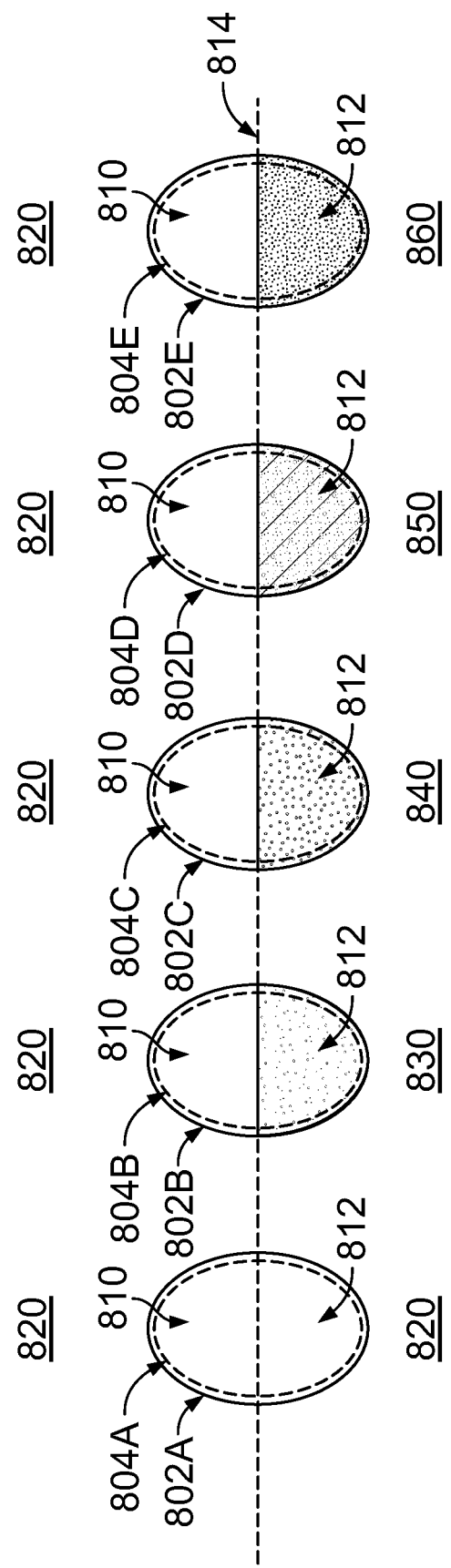
FIG. 8 illustrates plural different states of electrical film components of a window system, according to an example of the present disclosure.

FIG. 8 illustrates plural different states of electrical film components 804A-E of a window system, according to an example of the present disclosure. In the illustrated example, each of the electrical film component 804A-E is operably coupled with a surface of a corresponding window structure 802A-E. Each electrical film component 804A-E includes an upper region 810 and a lower region 812 that is separated by the upper region 810 by an axis 814. Optionally, one or more of the electrical film components may include more than two different regions, the two or more different regions may have substantially similar areas or may have different sizes and/or different areas, or may have any alternative arrangement.

The upper region 810 of each electrical film component 804A-E can be controlled to change between the plural different states independently of the lower region 812 of the same electrical film component 804A-E. For example, the upper region 810 of a first electrical film component 804A is in a transparent state 820, and the lower region 812 of the first electrical film component 804A is in the same transparent state 820. The upper region 810 of a second electrical film component 804B is in the transparent state 820, and the lower region 812 of the second electrical film component 804B is in a second partial state 830. The upper region 810 of a third electrical film component 804C is in the transparent state 820, and the lower region 812 of the third electrical film component 804C is in a third partial state 840. The upper region 810 of a fourth electrical film component 804D is in the transparent state 820, and the lower region 812 of the fourth electrical film component 804D is in a fourth partial state 850. The upper region 810 of a fifth electrical film component 804E is in the transparent state 820, and the lower region 812 of the fifth electrical film component 804E is in an opaque state 860.

In one or more examples, the window structures may be exterior windows (e.g., coupled with the outboard walls of the aircraft) or may be interior windows. For example, FIGS. 9 and 10 illustrate a perspective interior view of an internal cabin 130 of an aircraft, according to an example of the present disclosure. The internal cabin 130 includes a divider system 900 that separates different sections of the aircraft (e.g., separates a first section, such as first or business class section from a second section, such as an economy section). In general, the divider system 900 provides a class divider assembly. The divider assembly 900 includes a pair of opposed vertical walls 906 and 908 separated by a passage 903 through which an aisle 914 passes. For example, the aisle 914 separates the plural seats 919 in the internal cabin 130.

Each of the vertical walls 906, 908 includes one or more interior window structures 902A-D, and one or more electrical film components 904A-D coupled to the corresponding window structures 902A-D. For example, the vertical wall 906 includes a first window structure 902A with a first electrical film component 904A coupled to a surface of the first window structure 902A, and a second window structure 902B with a second electrical film component 904B coupled to a surface of the second window structure 902B. The vertical wall 908 includes a third window structure 902C with a third electrical film component 904C coupled to a surface of the third window structure 902C, and a fourth window structure 902D with a fourth electrical film component 904D coupled to a surface of the fourth window structure 902D. In another example, the vertical call 906 may include a single window structure, with one or more electrical film components operably coupled thereto, and/or the vertical wall 908 may include a single window structure, with one or more electrical film components operably coupled thereto.

The window system may include one or more power sources (not shown) that may provide power to the electrical film components. As one example, a first power source may store and provide power to the first and second electrical film components 904A, 904B, and a second power source may store and provide power to the third and fourth electrical film components 904C, 904D. In alternative embodiments, the electrical film components 904A-D may receive power from one or more power sources in a different arrangement.

In the illustrated example shown in FIG. 9, the first electrical film component 904A is in a partial opaque state 940, the second electrical film component 904B is in an opaque state 960, the third electrical film component 904C is in a transparent state 920, and the fourth electrical film component 904D is in the opaque state 960. In the illustrated embodiment shown in FIG. 10, all of the electrical film components 904A-D are changed to the opaque state 960. The state of the different electrical film components may be wirelessly controlled, such as by a pilot of the aircraft, by a flight attendant, or by other personal. In one or more embodiments, a flight attendant may use a smartphone, a tablet, or other processing system to wirelessly control the state of one or more of the electrical film components.

In one or more examples, the electrical film component may be printed and/or arranged to change a level of transparency of information printed onto the electrical film component. For example, the electrical film component may be operably coupled with an alternative structure, and the state of the electrical film component may be changed to display and/or hide information. In the illustrated example shown in FIGS. 9 and 10, the internal cabin 130 also includes an informational sign 916 that includes an electrical film component 918. The electrical film component may change between an opaque state, a transparent state, and plural partial opaque and/or partial transparent states. In the illustrated example shown in FIG. 9, the electrical film component 918 is in the opaque state 960, and is able to be viewed by passengers onboard the aircraft. Alternatively, in the illustrated example shown in FIG. 10, the electrical film component 918 is in a partial transparent state 930. The state of the electrical film component 918 may be wirelessly controlled by a pilot, by a flight attendant, or the like.

Further, the disclosure comprises examples according to the following clauses:

Clause 1: a window system, comprising:
a window structure including a first surface and an opposite second surface;
an electrical film component operably coupled with the second surface of the window structure, the electrical film component configured to be controlled to change between plural different states; and
a power source configured to provide power to the electrical film component to change the electrical film component between the plural different states.

Clause 2: the window system of clause 1, wherein the power source is configured to receive power from one or more sources, and the power source is configured to store at least some of the power received from the one or more sources.

Clause 3: the window system of clauses 1 or 2, wherein the electrical film component is configured to change between the plural different states to control a level of transparency of the window structure.

Clause 4: the window system of clauses 1-3, wherein the plural different states of the electrical film component includes an opaque state, a transparent state, plural partial opaque states, and plural partial transparent states.

Clause 5: the window system of clauses 1-4, wherein the electrical film component includes a sensor, wherein the electrical film component is configured to change between the plural different states responsive to detection of thermal energy proximate to the first surface of the window structure by the sensor.

Clause 6: the window system of clauses 1-5, wherein the electrical film component is configured to be wirelessly controlled to change between the plural different states.

Clause 7: the window system of clauses 1-6, wherein the electrical film component includes different regions, wherein each of the different regions are configured to be independently controlled to change between the plural different states.

Clause 8: the window system of clauses 1-7, wherein the window structure is a first window structure and the electrical film component is a first electrical film component, the window system further comprising:
a second window structure including a first surface and an opposite second surface; and
a second electrical film component operably coupled with the second surface of the second window structure,
wherein the first electrical film component and the second electrical film component are configured to be wirelessly controlled to change between the plural different states.

Clause 9: the window system of clause 8, wherein the power source is operably coupled with the first electrical film component and the second electrical film component, and is configured to provide power to both the first electrical film component and the second electrical film component.

Clause 10: the window system of clause 8, wherein the power source is a first power source operably coupled with the first electrical film component, and further comprising a second power source operably coupled with the second electrical film component, the second power source configured to provide power to the second electrical film component to change the second electrical film component between the plural different states.

Clause 11: the window system of clauses 1-10, wherein the electrical film component is a flexible structure.

Clause 12: the window system of clauses 1-11, wherein the window structure is one or more of an interior window or an exterior window.

Clause 13: the window system of clauses 1-12, wherein the window structure is an existing window structure, and wherein the electrical film component is configured to be retrofitted onto the existing window structure.

Clause 14: a method, comprising, changing a state of an electrical film component between plural different states, the electrical film component configured to be operably coupled with a first surface of a window structure, the electrical film component configured to receive power from a power source to change the state of the electrical film component between the plural different states.

Clause 15: the method of clause 14, further comprising wirelessly changing the state of the electrical film component between the plural different states.

Clause 16: the method of clauses 14 or 15, further comprising changing the state of the electrical film component by detecting thermal energy proximate to the window structure.

Clause 17: the method of clauses 14-16, wherein the electrical film component includes different regions, and further comprising independently controlling each of the different regions to change between the plural different states.

Clause 18: an aircraft system, comprising:
an internal cabin;
plural window structures formed within one or more inboard walls or outboard walls of the internal cabin;
one or more electrical film components operably coupled with one or more of the plural window structures, the one or more electrical film components configured to be controlled to change between plural different states; and
one or more power sources configured to provide power to the one or more electrical film components to change between the plural different states,
wherein at least one of the one or more electrical film components is configured to be wirelessly controlled to change between the plural different states.

Clause 19: the aircraft system of clause 18, wherein the one or more electrical film components are configured to be wirelessly controlled to simultaneously change between the plural different states.

Clause 20: the aircraft system of clauses 18 or 19, wherein the one or more electrical film components include sensors, wherein the one or more electrical film components are also configured to change between the plural different states responsive to a detection of thermal energy proximate to the corresponding window structure of the one or more electrical film components by the sensors.

As described herein, examples of the present disclosure provide systems and methods for moving safety rail systems between loaded positions and unloaded positions, such as to provide safety to operators standing on an elevated platform, to allow movement of items (e.g., equipment, systems, or the like) over the stationary platform, to allow movement of the elevated platform from one location to another without interfering with a structure (e.g., an airplane or any other structure).

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A window system, comprising:
   a window structure including a first surface and an opposite second surface;
   an electrical film component operably coupled with the second surface of the window structure, the electrical film component including a layer of electrical ink including plural ink molecules; and
   a power source configured to provide power to the electrical film component
   wherein the ink molecules of the electrical ink include capacitive touch sensors, wherein an arrangement of the ink molecules within the electrical ink is configured to change responsive to detection of contact by the capacitive touch sensors, wherein changing the arrangement of the ink molecules changes a state of the electrical film component between plural different states.

2. The window system of claim 1, wherein the power source is configured to receive power from one or more sources, and wherein the power source is configured to store at least some of the power received from the one or more sources.

3. The window system of claim 1, wherein the electrical film component is configured to change between the plural different states to control a level of transparency of the window structure.

4. The window system of claim 1, wherein the plural different states of the electrical film component includes an opaque state, a transparent state, plural partial opaque states, and plural partial transparent states.

5. The window system of claim 1, wherein the electrical film component includes a thermal sensor, wherein the electrical film component is configured to change between the plural different states responsive to a detection of thermal energy proximate to the first surface of the window structure by the thermal sensor.

6. The window system of claim 1, wherein the electrical film component is configured to be wirelessly controlled to change between the plural different states.

7. The window system of claim 1, wherein the electrical film component includes plural different regions, wherein each of the plural different regions are configured to be independently controlled to change between the plural different states.

8. The window system of claim 1, wherein the window structure is a first window structure and the electrical film component is a first electrical film component, the window system further comprising:
   a second window structure including a first surface and an opposite second surface; and
   a second electrical film component operably coupled with the second surface of the second window structure,
   wherein the first electrical film component and the second electrical film component are configured to be wirelessly controlled to change between the plural different states.

9. The window system of claim 8, wherein the power source is operably coupled with the first electrical film component and the second electrical film component, and is configured to provide power to both the first electrical film component and the second electrical film component.

10. The window system of claim 8, wherein the power source is a first power source operably coupled with the first electrical film component, and further comprising a second power source operably coupled with the second electrical film component, the second power source configured to provide power to the second electrical film component to change the second electrical film component between the plural different states.

11. The window system of claim 1, wherein the electrical film component is a flexible structure.

12. The window system of claim 1, wherein the window structure is one or more of an interior window or an exterior window.

13. The window system of claim 1, wherein the window structure is an existing window structure, and wherein the electrical film component is configured to be retrofitted onto the existing window structure.

14. A method for controlling operation of a window system, the window system comprising:

a window structure including a first surface and an opposite second surface;

an electrical film component operably coupled with the second surface of the window structure, the electrical film component including a layer of electrical ink including plural ink molecules, wherein the ink molecules of the electrical ink include capacitive touch sensors; and a power source configured to provide power to the electrical film component, the method comprising:

changing a state of the electrical film component between plural different states by changing the arrangement of the ink molecules within the electrical ink responsive to detection of contact by the capacitive touch sensors.

15. The method of claim 14, further comprising wirelessly changing the state of the electrical film component between the plural different states.

16. The method of claim 14, further comprising changing the state of the electrical film component by detecting thermal energy proximate to the window structure.

17. The method of claim 14, wherein the electrical film component includes plural different regions, and further comprising independently controlling each of the plural different regions to change between the plural different states.

18. A window system configured to be disposed within an internal cabin of an aircraft system, the window system comprising:

plural window structures formed within one or more of inboard walls or outboard walls of the internal cabin, each of the plural window structures comprising a first surface and an opposite second surface; and one or more electrical film components operably coupled with the second surfaces of one or more of the plural window structures, each electrical film component including a layer of electrical ink including plural ink molecules, wherein the ink molecules of the electrical ink include capacitive touch sensors, wherein an arrangement of the ink modules within the one or more electrical film components is configured to change responsive to detection of contact by the capacitive touch sensors, wherein changing the arrangement of the ink molecules changes a state of the one or more electrical film components between plural different states, and wherein at least one of the one or more electrical film components is configured to be wirelessly controlled to change between the plural different states.

19. The window system of claim 18, further comprising two or more electrical film components, wherein at least two of the two or more electrical film components are configured to be wirelessly controlled to simultaneously change between the plural different states.

20. The window system of claim 18, wherein the one or more electrical film components include thermal sensors, wherein the one or more of the electrical film components are also configured to change between the plural different states responsive to a detection of thermal energy proximate to the corresponding window structures of the one or more electrical film components by the thermal sensors.

* * * * *